United States Patent
Matsuo

(10) Patent No.: US 7,236,262 B2
(45) Date of Patent: Jun. 26, 2007

(54) RECORDING MEDIUM, PRINTER CONTROL METHOD, AND PRINTER CONTROL SYSTEM

(75) Inventor: Satoshi Matsuo, Otsu (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 920 days.

(21) Appl. No.: 09/950,671

(22) Filed: Sep. 13, 2001

(65) Prior Publication Data

US 2002/0030852 A1 Mar. 14, 2002

(30) Foreign Application Priority Data

Sep. 14, 2000 (JP) .............................. 2000-279815

(51) Int. Cl.
*G06K 15/00* (2006.01)
(52) U.S. Cl. ...................... 358/1.6; 358/1.18; 358/1.15
(58) Field of Classification Search ............... 358/1.15, 358/1.1, 1.3, 1.7, 1.9, 1.12, 1.13, 402, 401, 358/451, 1.6, 1.18
See application file for complete search history.

(56) References Cited

U.S. PATENT DOCUMENTS

| | | | |
|---|---|---|---|
| 5,036,476 A | 7/1991 | Yamaguchi et al. | |
| 6,031,623 A * | 2/2000 | Smith et al. | 358/1.14 |
| 6,042,278 A * | 3/2000 | Spencer et al. | 400/61 |
| 6,088,120 A * | 7/2000 | Shibusawa et al. | 358/1.15 |
| 6,188,490 B1 | 2/2001 | Miyake | |
| 6,337,745 B1 * | 1/2002 | Aiello et al. | 358/1.15 |
| 6,549,654 B1 * | 4/2003 | Kumada | 382/162 |
| 6,567,175 B1 * | 5/2003 | Lee | 358/1.14 |
| 6,606,162 B1 * | 8/2003 | Simpson | 358/1.15 |
| 6,631,008 B2 * | 10/2003 | Aoki | 358/1.15 |
| 6,814,510 B1 * | 11/2004 | Sabbagh et al. | 400/63 |
| 6,816,271 B1 * | 11/2004 | Takahashi | 358/1.13 |
| 6,909,520 B2 * | 6/2005 | Ogino | 358/1.15 |
| 2002/0051176 A1 * | 5/2002 | Kato | 358/1.15 |
| 2002/0184342 A1 * | 12/2002 | Kennedy et al. | 709/219 |

* cited by examiner

*Primary Examiner*—Jerome Grant, II
(74) *Attorney, Agent, or Firm*—Buchanan Ingersoll & Rooney PC

(57) ABSTRACT

A printer driver recognizes, of a plurality of printers on a network, a printer included in a common category. Only basic settings for printing (the paper size, the print direction, etc.) are made on the printers included in the same category by the printer driver. So that, the printers on the network can be easily used without a waste of space of a storage device included in the system.

22 Claims, 9 Drawing Sheets

RECORDING MEDIUM, PRINTER CONTROL METHOD, AND PRINTER CONTROL SYSTEM

CROSS-REFERENCE TO RELATED APPLICATIONS

This application is based on application No. 2000-279815 filed in Japan, the contents of which are hereby incorporated by reference.

BACKGROUND OF THE INVENTION

1. Field of the Invention

The present invention relates to a printer driver, and more particularly, to a printer driver capable of controlling a plurality of printers on a network.

2. Description of the Related Art

To print data generated by use of a data processor such as a personal computer, a printer driver (software) is necessary having a function of converting the generated data into data that can be accepted by an image forming apparatus such as a printer and transmitting the converted data to the image forming apparatus. Conventionally, printer drivers and printers are in a one-to-one relationship, and when printers of different models are used, it is necessary for the user to install a printer driver specific to each printer on the computer.

However, installing even the printer driver of a not frequently used printer is a waste of space of a storage device such as a fixed disk in the computer. Although it is desirable that installation of such a printer driver be avoided, presence of a printer that cannot be used on the computer network is sometimes disadvantageous to the user.

OBJECTS AND SUMMARY

The present invention is made to solve the above-mentioned problem, and a principal object thereof is to provide a printer driver that enables use of a plurality of printers on a network without a waste of storage device space.

A first characteristic is that on a computer-readable recording medium, a program converting data generated by use of a data processor to data that can be accepted by a printer, and transmitting the data to the printer is recorded, and that the program comprises the steps of: (a) searching for, of a plurality of printers networked to the data processor, a printer belonging to a predetermined category; and (b) providing a print instruction to the found printer belonging to the predetermined category based only on a basic setting common to a plurality of printers.

The embodiment further has the following characteristics:

The program further comprises, prior to the step (b), the step of detecting a printing acceptance possible state of the found printer belonging to the predetermined category.

At the step (a), a plurality of found printers belonging to the predetermined category is listed, and at the step (b), the print instruction is provided to a printer selected from the list.

The basic setting common to a plurality of printers includes a paper size and a print direction.

The predetermined category is at least one of a page description language kind and an interface kind.

Moreover, the predetermined category is a maker of the printer.

A second characteristic is that a print control method converting data generated by use of a data processor to data that can be accepted by a printer, and causing the printer to print the data, comprises the steps of: (a) searching for, of a plurality of printers networked to the data processor, a printer belonging to a predetermined category; and (b) providing a print instruction to the found printer belonging to the predetermined category based only on a basic setting common to a plurality of printers.

A third characteristic is that a print controller converting data to data that can be accepted by a printer, and causing the printer to print the data, comprises: search means for searching for, of a plurality of printers networked to a data processor, a printer belonging to a predetermined category; and instruction means for providing a print instruction to the found printer belonging to the predetermined category based only on a basic setting common to a plurality of printers.

A fourth characteristic is that a print control method converting data to data that can be accepted by a printer, and causing the printer to print the data by use of a printer driver, comprises the steps of: determining whether a driver common to a plurality of kinds of printers belonging to a predetermined category is selected or not; when the common driver is selected, searching for, of printers connected to a network, printers belonging to the predetermined category, and listing found printers; and setting a print condition only for a basic setting item of the common driver by an input by an operator, and causing a printer selected from the list to perform printing.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

<A. General Outline of Present Embodiment>

A printer driver according to the present embodiment recognizes, of a plurality of printers on a network, a printer included in a common category, and makes only basic settings for printing (the paper size, the print direction, etc.) on the printer included in the common category. This type of printer driver will be referred to as a common driver.

B. System Configuration

Figure 1:
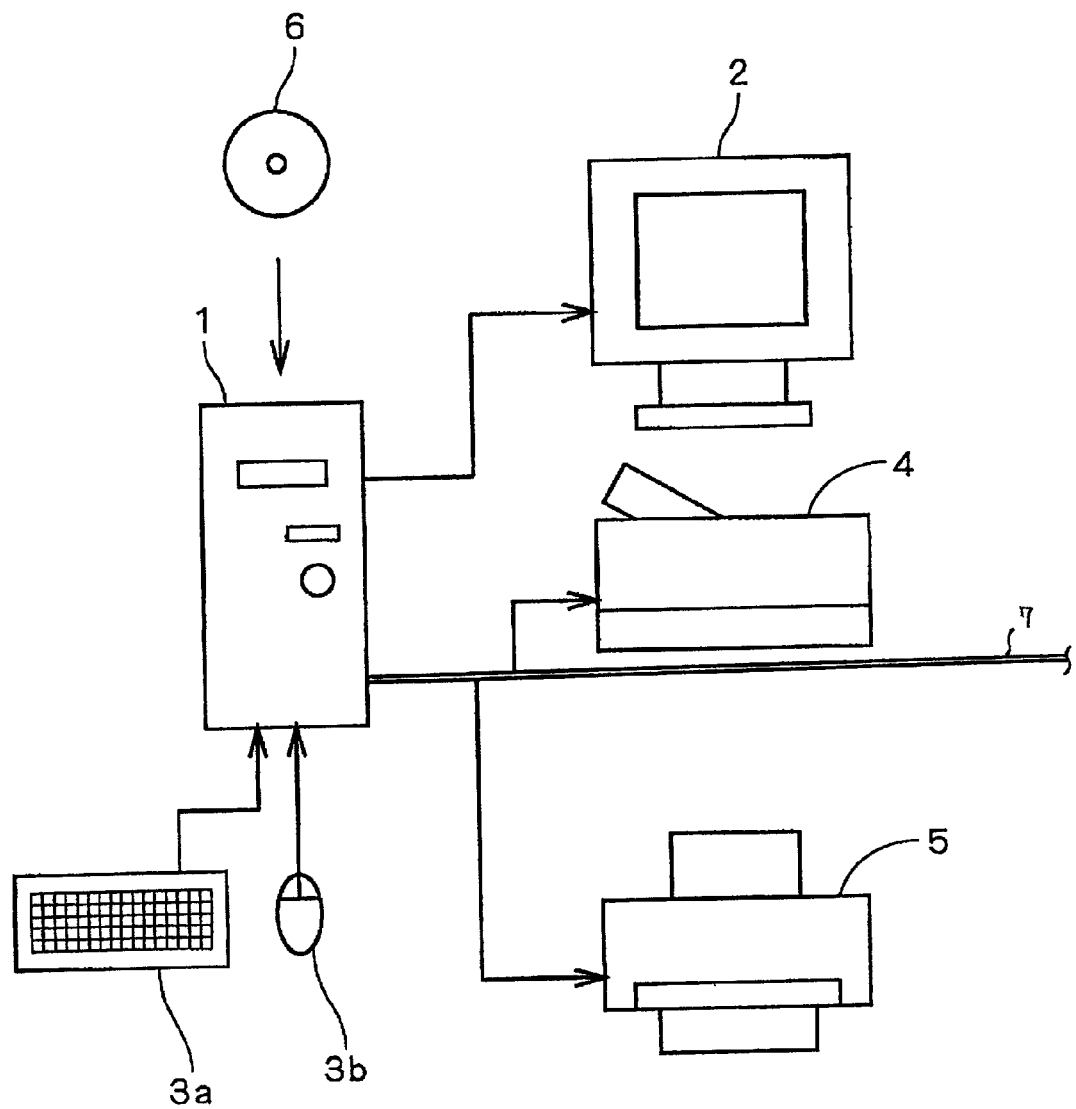
FIG. 1 shows the configuration of a printer control system according to an embodiment of the present invention.

FIG. 1 shows the configuration of a system that realizes printer control by the printer driver according to the present embodiment. In FIG. 1, a display 2, and a keyboard 3a and a mouse 3b as an operation portion that accepts input from the operator are connected to a computer 1. To the computer 1, a network 7 such as a local-area network (LAN) is also connected. To the network 7, printers 4 and 5 of different models, and non-illustrated other printers and computers are connected. The computer 1 controls and manages these printers.

A printer driver which is software is installed on the computer 1. The printer driver operation-controls and manages the printers 4 and 5 connected to the network 7. This program is installed onto the computer 1 through an optical disk such as a CD-ROM 6, or a recording medium such as a magnetic disk or a magneto-optical disk. While FIG. 1 shows an example in which two printers are connected, three or more printers of different kinds may be connected.

Figure 2:
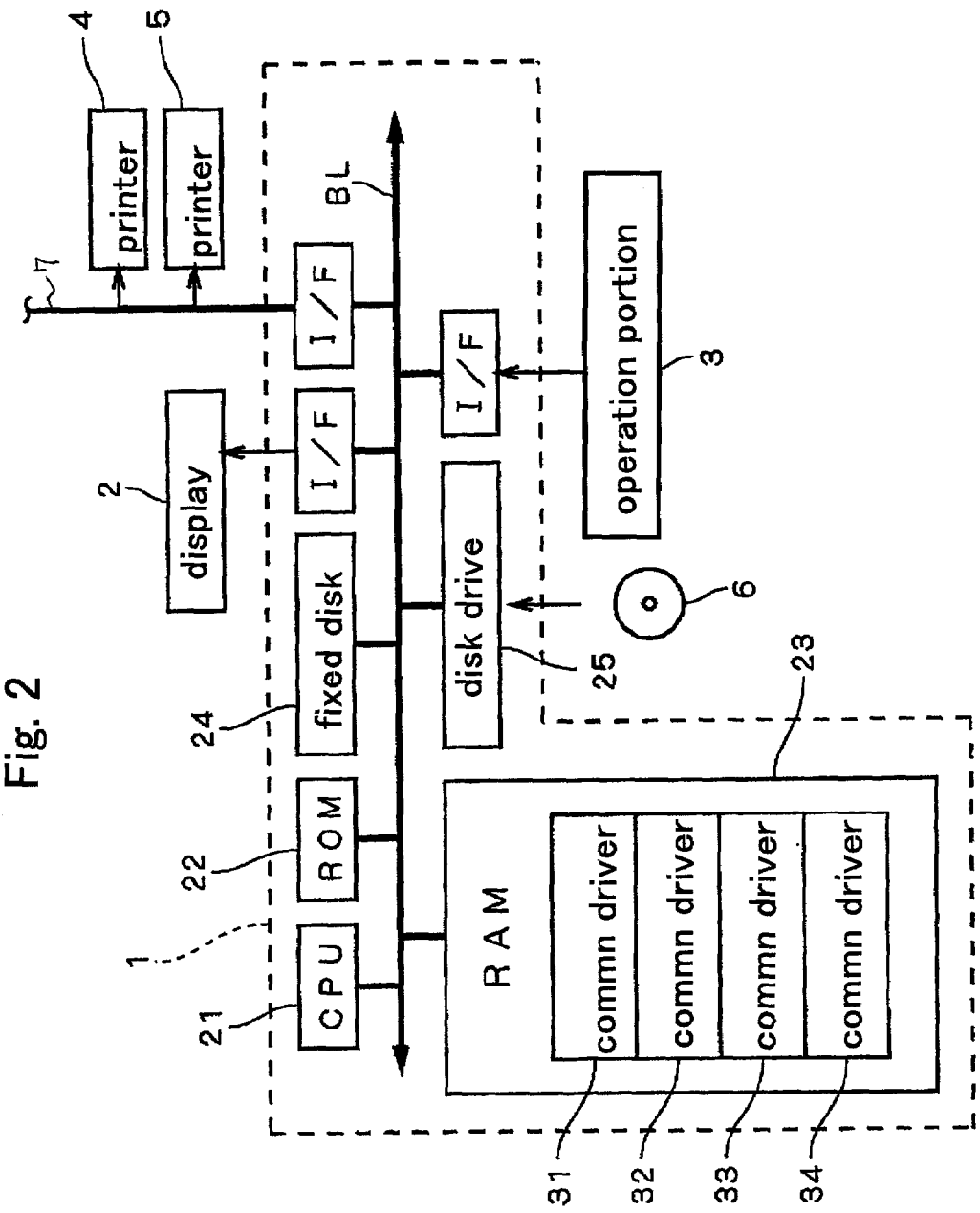
FIG. 2 is a block diagram showing the internal configuration of a computer together with devices connected thereto.

FIG. 2 is a block diagram showing the internal configuration of the computer 1 together with the devices connected thereto. The computer 1 has a similar configuration to ordinary computers. In the computer 1, a central processing unit (CPU) 21 that performs computing, a read-only memory (ROM) 22 in which a basic program is stored, and a random-access memory (RAM) 23 serving as a work area of software such as common drivers 31, 32, 33 and 34 are connected to a buss line BL.

To the bus line BL, a fixed disk 24 on which various kinds of data are recorded and a disk drive 25 that reads a program or the like from a recording medium 6 such as a CD-ROM 6 are connected through predetermined interfaces. A display 2 which is an external device, and an interface (I/F) for connecting the network 7 or the like are also connected to the bus line BL. To the network 7, a plurality of printers of different kinds such as the printers 4 and 5 is connected. In FIG. 2, the keyboard 3a and the mouse 3b are shown as an operation portion 3.

C. Printer Control

Figure 3:
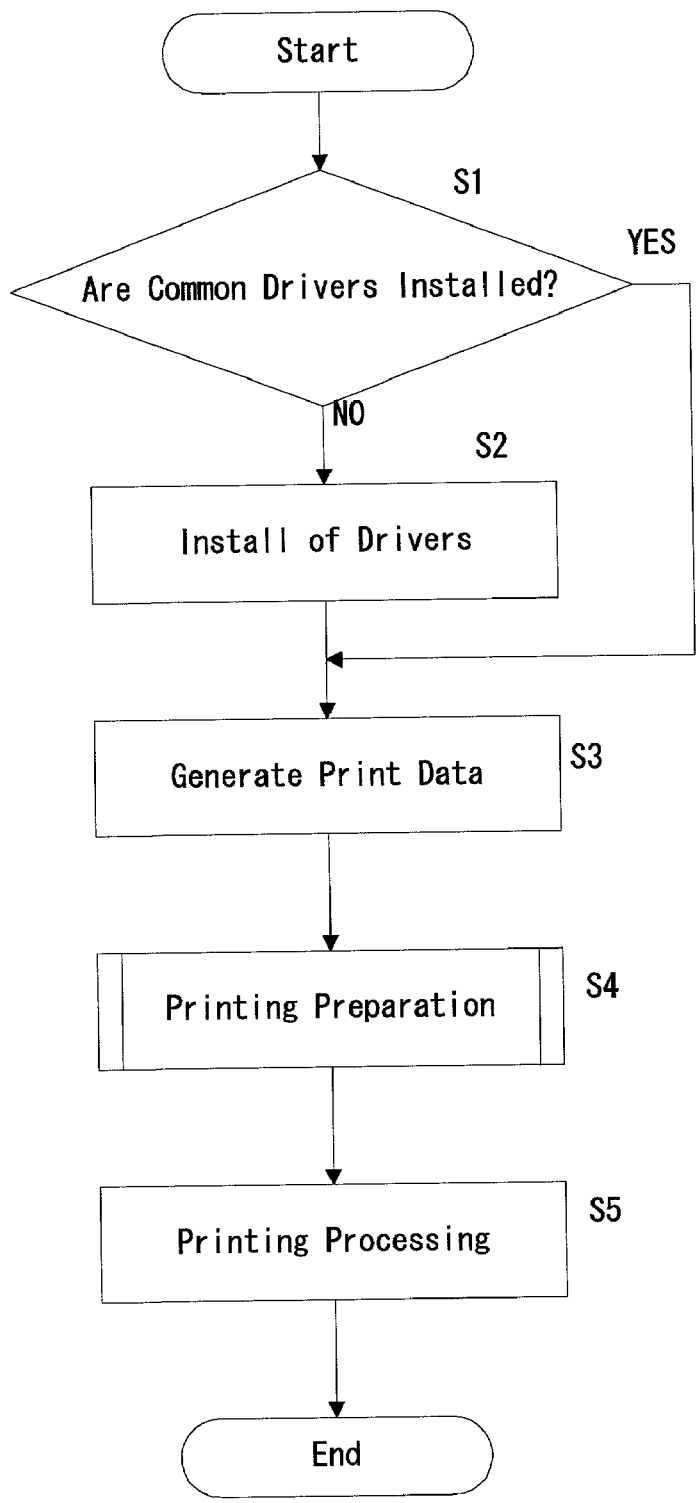
FIG. 3 is a flowchart of printer control by the computer.

FIG. 3 is a flowchart of printer control by the printer driver according to the present embodiment.

In this printer control by the printer driver, it is necessary that the above-mentioned common drivers be installed, for example, on the fixed disk 24 (FIG. 2). At step S1 of FIG. 3, whether the common drivers are installed or not is checked.

This is performed in accordance with an operation by the user prior to printing. Conventionally, whether a printer driver specific to each printer is installed or not is checked.

When the common drivers are not installed, they are installed at step S2.

Then, print data is generated by use of various pieces of application software (step S3), and printing preparation at step S4 is started. In the printing preparation, the common drivers are utilized.

After the printing preparation is finished, a print instruction is provided to the printer based on the print setting made at step S4 to perform printing (step S5). With this, a series of printing operations is ended.

The operation at step S4 will be further described.

D. Printing Preparation Step

Figure 4:
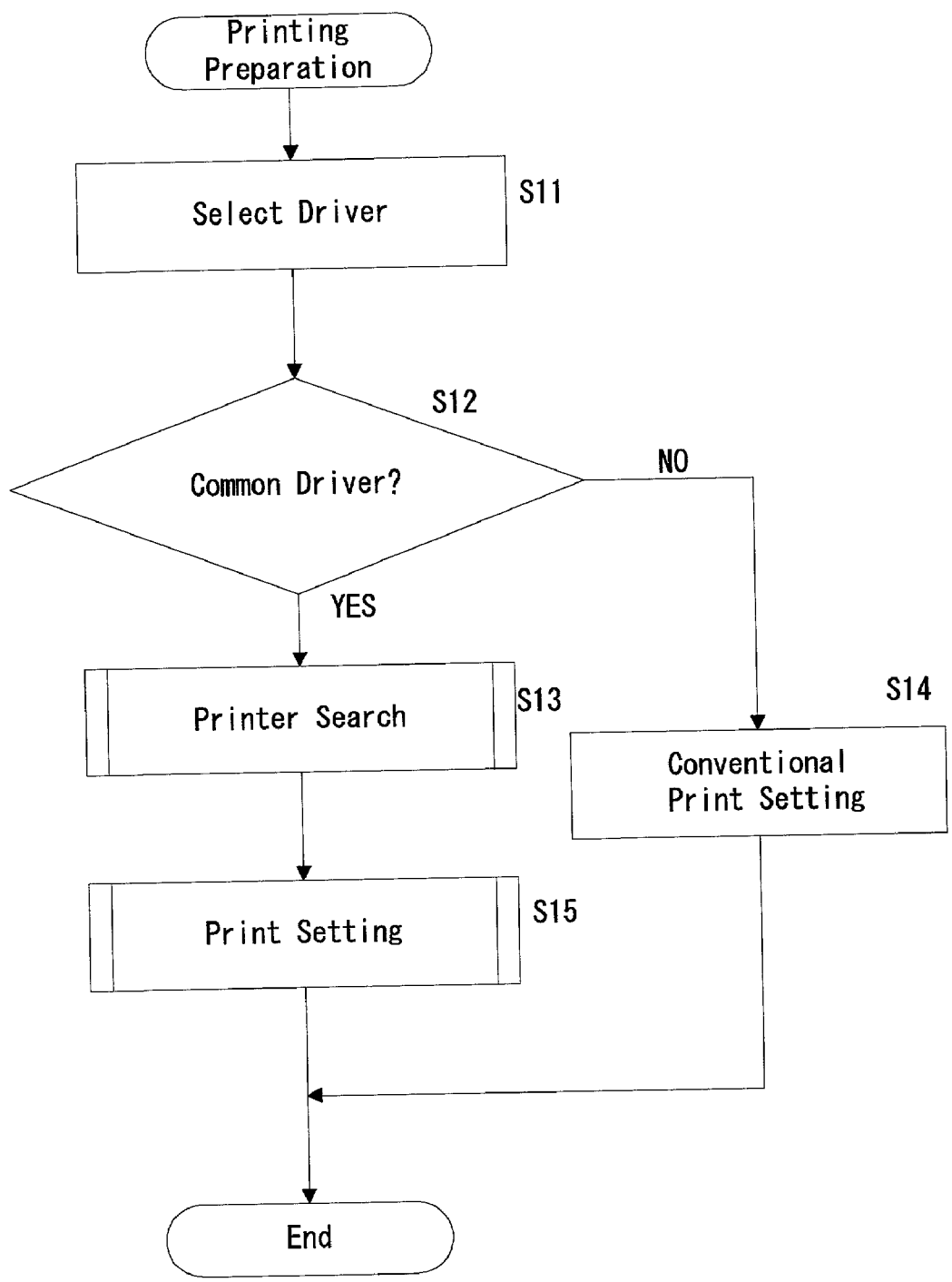
FIG. 4 is a flowchart of printing preparation in the printer control.

FIG. 4 is a flowchart detailing the printing preparation (step S4) shown in FIG. 3.

First, at step S11, a driver for the printer which the user uses for printing is selected.

Then, at step S12, whether the selected driver is a common driver or not is determined. When a driver other than a common driver is selected, conventional print setting is performed (step S14).

A driver other than a common driver is selected when the user wants to make, in printing, not only basic settings (the paper size, the print direction, etc.) but also settings such as the print quality, the paper tray, the place to which the paper is ejected, the layout printing, and option settings (duplex printing, etc.). In this case, the printer driver specific to the printer is used.

The operations at steps up to step 12 are performed by use of basic software for printing included in the operating system (OS).

When the selected driver is a common driver, the operation of the common driver is started, and at step S13, of the printers on the network, printers belonging to the same category are searched for. Then, at step S15, predetermined print settings are made. With this, a series of printing preparations is ended.

The common driver will be further described. Classifying a plurality of printers on a network according to a common category, in some cases, the printers are divided into a plurality of categories. For example, the printers can be classified into printers manufactured by the maker of the common driver and printers manufactured by other makers, or can be classified according to the page description language or the interface type into printer control language (PCL) printers, post script (PS) printers and graphics device interface (GDI) printers.

Since the three printer types, the PCL printer, the PS printer and the GDI printer make up most of the standardized printer types, by preparing a common driver supporting each of the three types, most of a plurality of printers on a network can be controlled.

Moreover, the printers are classified into printers manufactured by the maker of the common driver and printers manufactured by other makers for the following reason: When printers of unique types other than the three types which printers are manufactured by printer makers including the maker of the common driver are present on the network, since it is possible to produce a common driver for the printers manufactured by the maker of the common driver although it is difficult to produce a common driver for the printers manufactured by other makers, the printers manufactured by the maker of the common driver are controlled by the common driver.

As described above, by providing a common driver for each of the above-mentioned four categories, most of the printers on the network can be controlled.

When a common driver for each of the four categories is provided, the driver selection at step S11 is made from among the four common drivers for the four categories and the driver specific to the printer.

The printer searches described below are for a case where the common drivers for the four categories are provided.

D-1. Printer Search

D-1-1. Search for Printer Manufactured by Maker of Common Driver

First, a printer search performed by a common driver supporting printers manufactured by the maker of the common driver (here, Minolta) when the common driver is selected at step S11 of FIG. 4 will be described with reference to the flowchart of FIG. 5.

Figure 5:
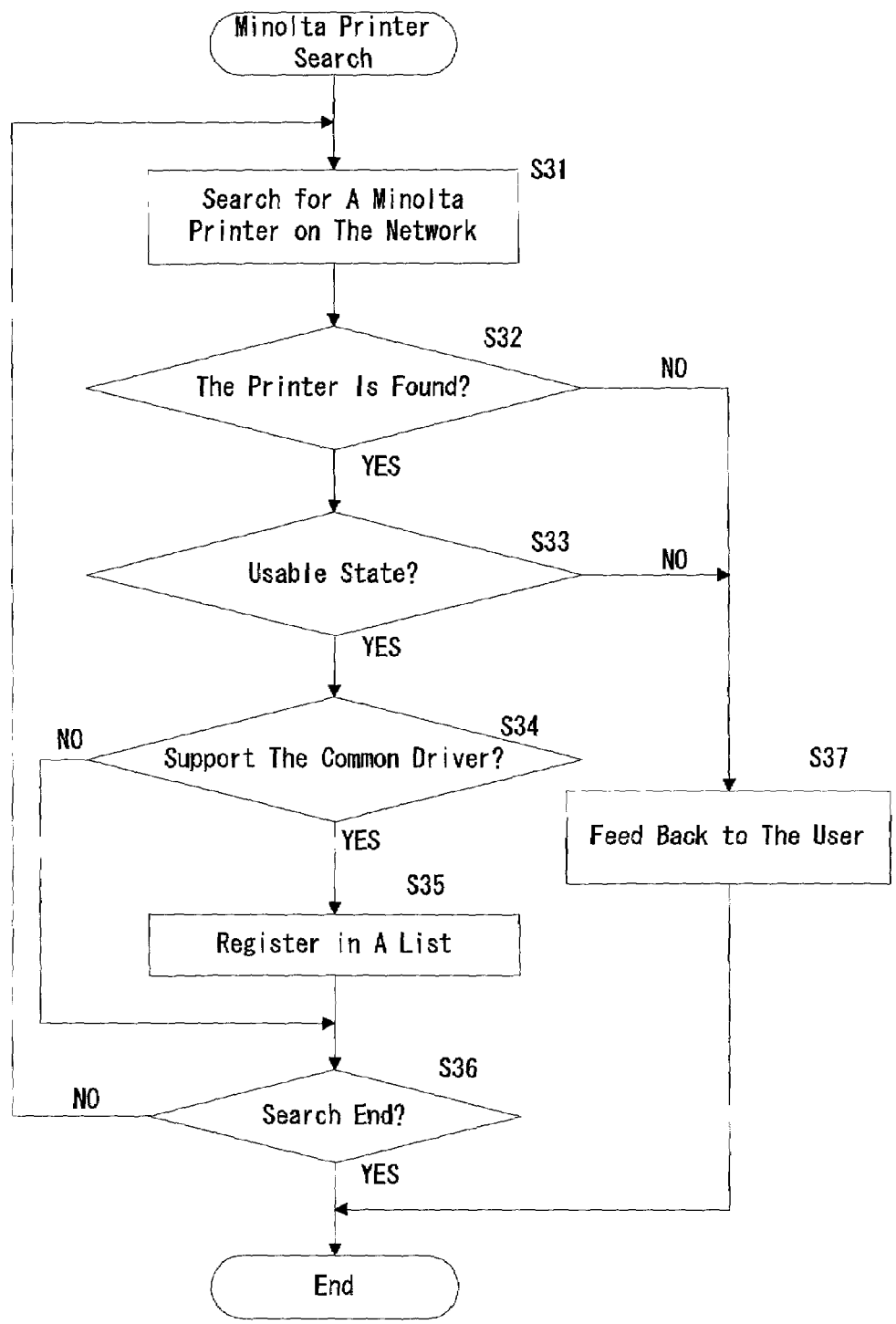
FIG. 5 is a flowchart of a printer search in the printing preparation.

At step S31 of FIG. 5, the printers on the network are checked to search for a Minolta-manufactured printer. In this case, to distinguish Minolta-manufactured printers, with reference to the management information base (MIB) of the printer to be checked, information unique to the printer (object ID) is obtained. The unique information includes maker identification information and model identification information, and the maker identification information is used to determine whether the printer is a Minolta-manufactured printer or not.

Then, at step S32, whether the printer to be checked is a Minolta-manufactured printer or not is determined based on the maker identification information. When it is determined that the printer to be checked is a Minolta-manufactured printer, the status (printing acceptance state) of the printer is checked to determine whether the printer is in a usable state (state in which neither a paper-out condition nor a paper jam occurs) or not (step S33). This status can be obtained with reference to the MIB of the printer. This determination prevents a print instruction from being provided to a printer not ready for accepting printing.

When it is determined at step S33 that the printer to be checked is in a usable state, whether the printer is supported by the common driver or not is determined next (step S34).

This determination is made by comparing a table on the supported printer models preregistered in the common driver and the model information of the printer to be checked.

When it is determined at step S34 that the printer to be checked is supported by the common driver, the printer is registered in a list. The list is displayed on the display screen when the print setting (step S15) described with reference to FIG. 4 is performed. The user selects a printer to be used for printing from the list. This enables the user to smoothly select a printer. When it is determined that the printer to be checked is not supported by the common driver, the process proceeds to step S36.

At step S36, whether all the printers on the network have been checked or not is determined. When a printer not having been checked is present, the operations at step 31 and succeeding steps are repeated. When all the printers have been checked, the printer search is ended.

When no Minolta-manufactured printer is found at step S32 and when no usable printer is present at step S33, this is fed back to the user (step S37). Specifically, when no Minolta-manufactured printer supported by the selected common driver is present or when no usable printer is present after all the printers have been checked, for example, a message that no usable printer is present is displayed.

<D-1-2. Search for PS Printer>

Next, a printer search performed by a common driver supporting PS printers when the common driver supporting PS printers is selected at step S11 of FIG. 4 will be described with reference to the flowchart of FIG. 6.

Figure 6:
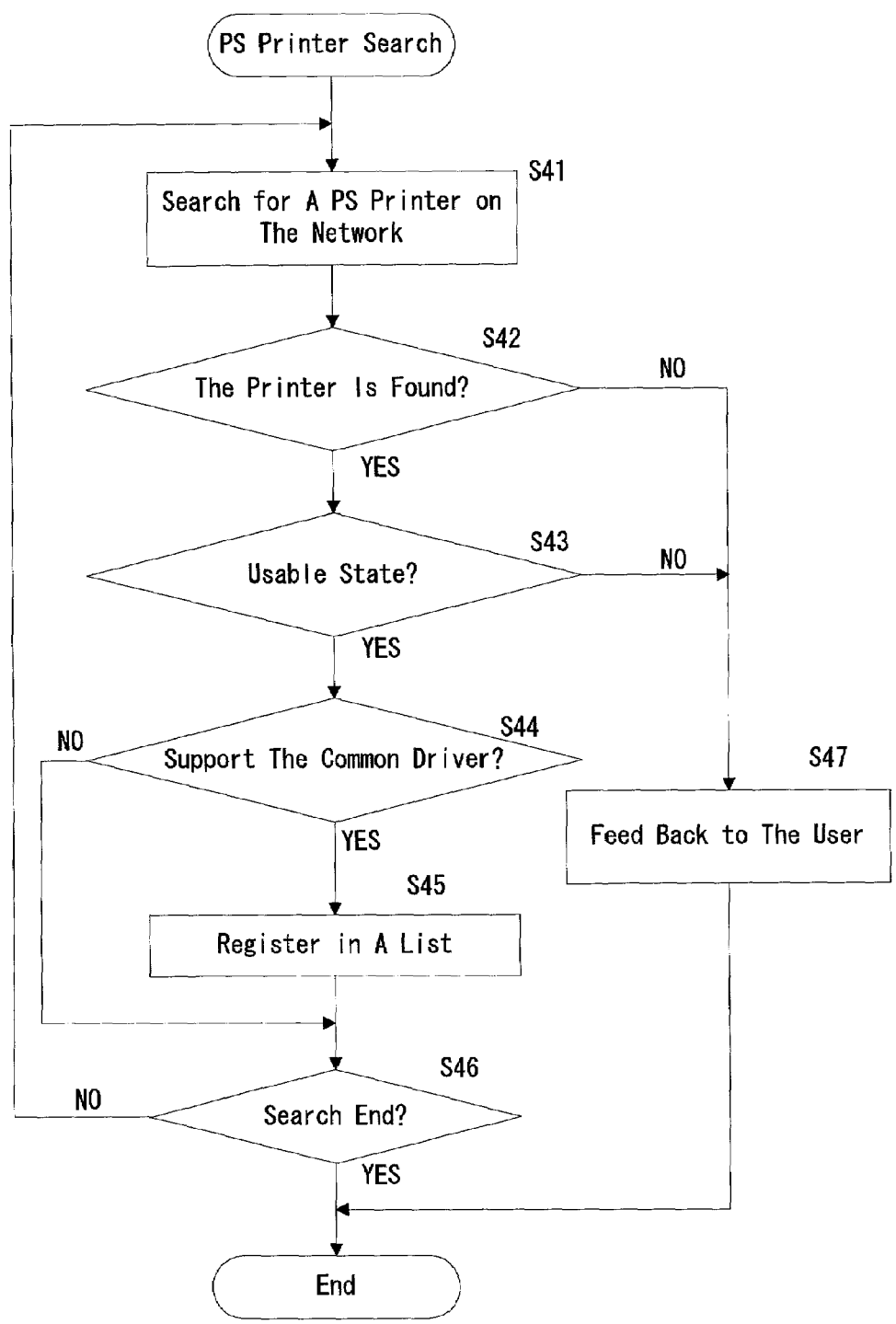
FIG. 6 is a flowchart of a printer search in the printing preparation.

At step S41 of FIG. 6, the printers on the network are checked to search for a PS printer. In this case, to distinguish PS printers, a PS command is sent to the printer to be checked, and when there is a response, the printer is determined to be a PS printer.

Then, at step S42, whether the printer to be checked is a PS printer or not is determined based on the response to the PS command. When it is determined that the printer to be checked is a PS printer, the status of the printer is checked to determine whether the printer is in a usable state (state in which neither a paper-out condition nor a paper jam occurs) or not (step S43).

When it is determined at step S43 that the printer to be checked is in a usable state, whether the printer is supported by the common driver or not is determined next (step S44).

This determination is made by comparing a table on the supported printer models preregistered in the common driver and the model information of the printer to be checked.

When it is determined at step S44 that the printer to be checked is supported by the common driver, the printer is registered in a list. The list is displayed on the display screen when the print setting (step S15) described with reference to FIG. 4 is made. The user selects a printer to be used for printing from the list. When it is determined that the printer to be checked is not supported by the common driver, the process proceeds to step S46.

At step S46, whether all the printers on the network have been checked or not is determined. When a printer not having been checked is present, the operations at step S41 and succeeding steps are repeated. When all the printers have been checked, the printer search is ended.

When no PS printer is found at step S42 and when no usable printer is present at step S43, this is fed back to the user (step S47). Specifically, when no PS printer supported by the selected common driver is present or when no usable printer is present after all the printers have been checked, for example, a message that no usable printer is present is displayed.

<D-1-3. Search for PCL Printer>

Next, a printer search performed by a common driver supporting PCL printers when the common driver supporting PCL printers is selected at step S11 of FIG. 4 will be described with reference to the flowchart of FIG. 7.

Figure 7:
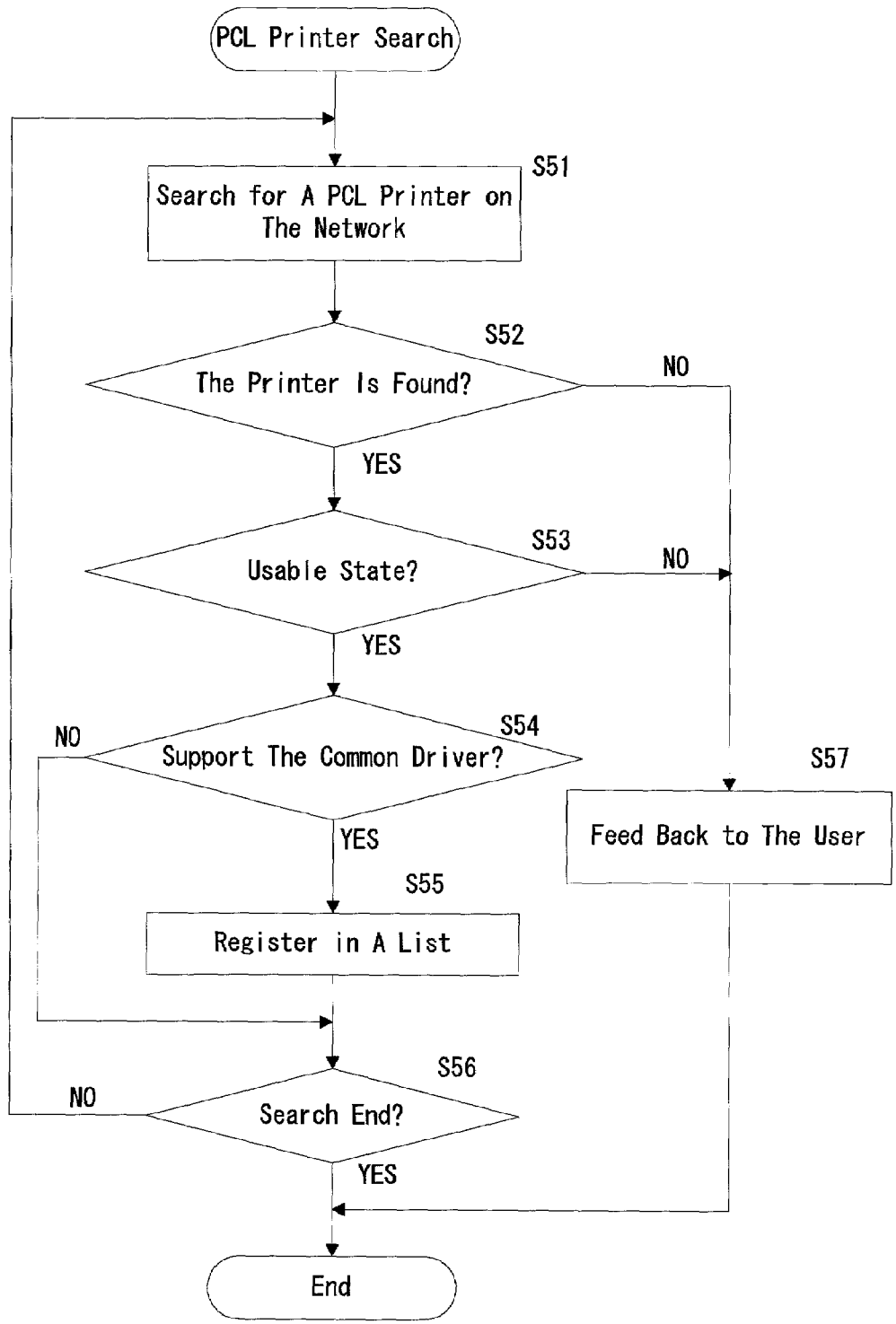
FIG. 7 is a flowchart of a printer search in the printing preparation.

At step S51 of FIG. 7, the printers on the network are checked to search for a PCL printer. In this case, to distinguish PCL printers, a PCL command is sent to the printer to be checked, and when there is a response, the printer is determined to be a PCL printer.

Then, at step S52, whether the printer to be checked is a PCL printer or not is determined based on the response to the PCL command. When it is determined that the printer to be checked is a PCL printer, the status of the printer is checked to determine whether the printer is in a usable state (state in which neither a paper-out condition nor a paper jam occurs) or not (step S53).

When it is determined at step S53 that the printer to be checked is in a usable state, whether the printer is supported by the common driver or not is determined next (step S54).

This determination is made by comparing a table on the supported printer models preregistered in the common driver and the model information of the printer to be checked.

When it is determined at step S54 that the printer to be checked is supported by the common driver, the printer is registered in a list. The list is displayed on the display screen when the print setting (step S15) described with reference to FIG. 4 is made. The user selects a printer to be used for printing from the list. When it is determined that the printer to be checked is not supported by the common driver, the process proceeds to step S56.

At step S56, whether all the printers on the network have been checked or not is determined. When a printer not having been checked is present, the operations at step S51 and succeeding steps are repeated. When all the printers have been checked, the printer search is ended.

When no PCL printer is found at step S52 and when no usable printer is present at step S53, this is fed back to the user (step S57). Specifically, when no PCL printer supported by the selected common driver is present or when no usable printer is present after all the printers have been checked, for example, a message that no usable printer is present is displayed.

<D-1-4. Search for GDI Printer>

Next, a printer search performed by a common driver supporting GDI printers when the common driver supporting GDI printers is selected at step S11 of FIG. 4 will be described with reference to the flowchart of FIG. 8.

Figure 8:
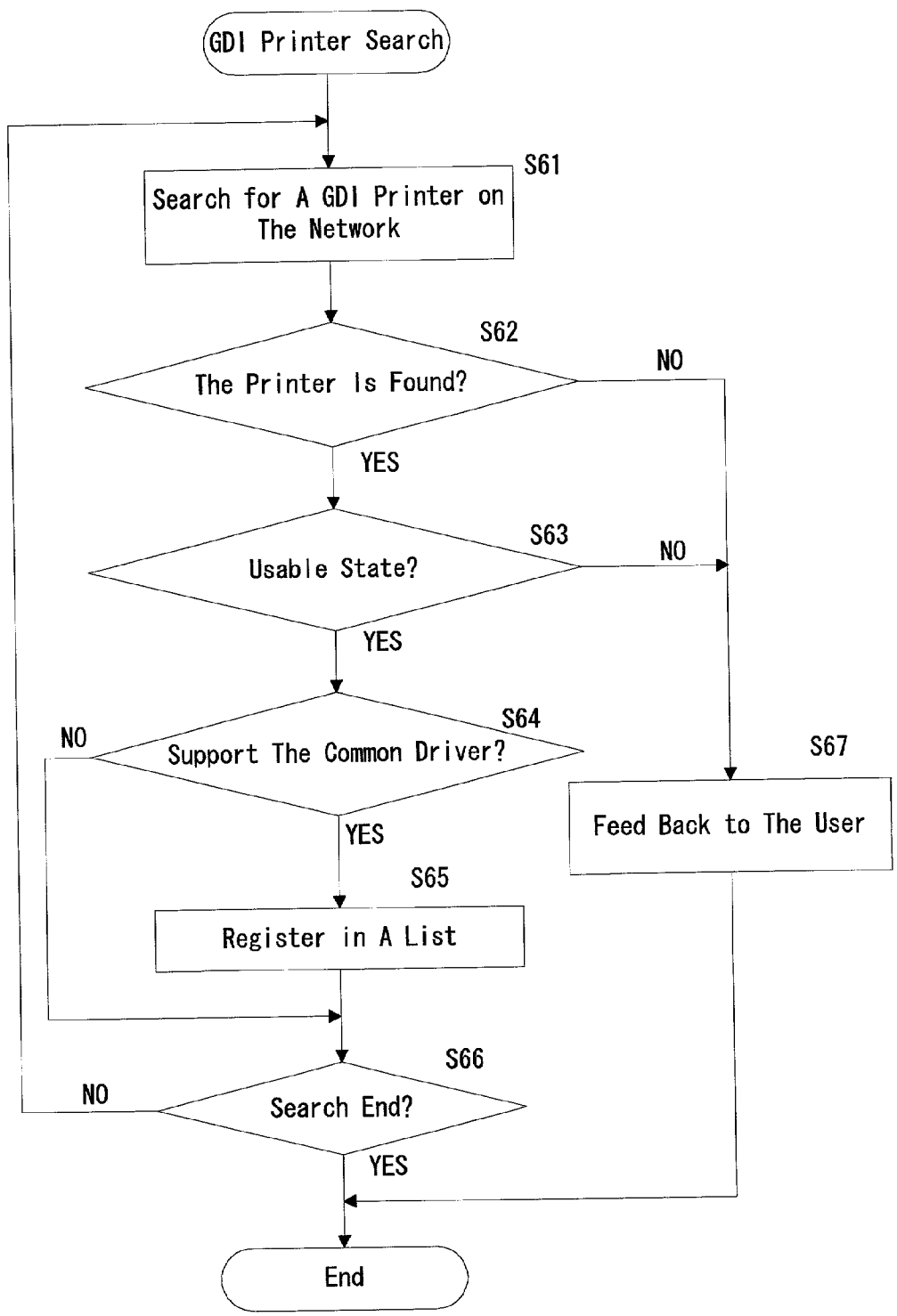
FIG. 8 is a flowchart of a printer search in the printing preparation.

At step S61 of FIG. 8, the printers on the network are checked to search for a GDI printer. In this case, to distinguish GDI printers, with reference to the MIB of the printer to be checked, information unique to the printer is obtained. Based on the maker identification information included in the unique information, first, whether the printer to be checked is a printer manufactured by the maker of the selected common driver (by Minolta) or not is determined. When the printer is a Minolta-manufactured printer, whether the printer is a GDI printer or not is determined based on the model information of the MIB. The reason why the printer to be used is limited to a Minolta-manufactured printer is that it is difficult to produce a common driver for GDI printers manufactured by other makers.

When it is determined at step S62 that the printer to be checked is a Minolta-manufactured printer and a GDI printer, the status of the printer is checked to determine whether the printer is in a usable state (state in which neither a paper-out condition nor a paper jam occurs) or not (step S63). This status can be obtained with reference to the MIB of the printer.

When it is determined at step S63 that the printer to be checked is in a usable state, whether the printer is supported by the common driver or not is determined next (step S64).

This determination is made by comparing a table on the supported printer models preregistered in the common driver and the model information of the printer to be checked.

When it is determined at step S64 that the printer to be checked is supported by the common driver, the printer is registered in a list. The list is displayed on the display screen when the print setting (step S15) described with reference to FIG. 4 is made. The user selects a printer to be used for printing from the list. When it is determined that the printer to be checked is not supported by the common driver, the process proceeds to step S66.

At step S66, whether all the printers on the network have been checked or not is determined. When a printer not having been checked is present, the operations at step S61 and succeeding steps are repeated. When all the printers have been checked, the printer search is ended.

When no supported GDI printer is found at step S62 and when no usable printer is present at step S63, this is fed back to the user (step S67). Specifically, when no GDI printer supported by the selected common driver is present or when no usable printer is present after all the printers have been checked, for example, a message that no usable printer is present is displayed.

<D-2. Print Setting>

Figure 9:
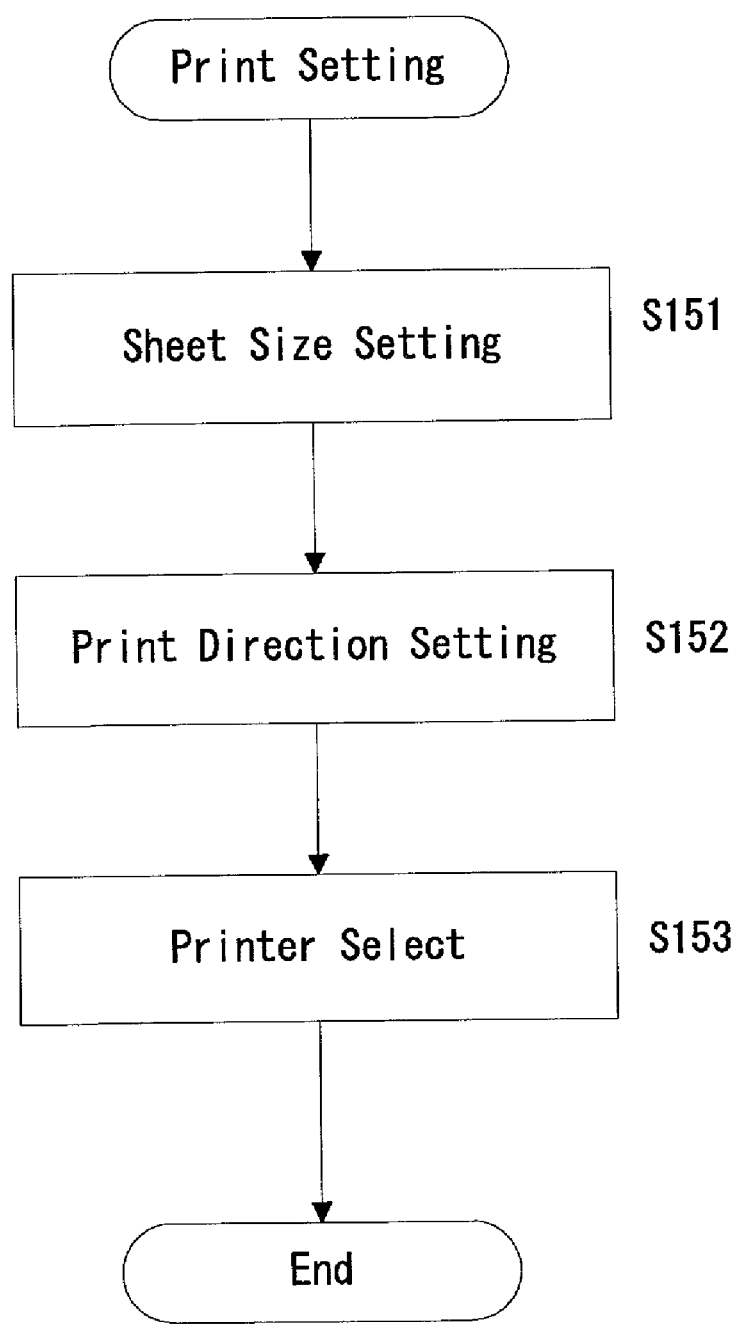
FIG. 9 is a flowchart of print setting in the printing preparation.

Lastly, the print setting (step S15) shown in FIG. 4 will be described with reference to the flowchart of FIG. 9.

When a common driver is used, setting items are limited to basic items indispensable to printing such as the paper size and the print direction. In FIG. 9, at step S151, the paper size is set, and at step S152, the print direction is set. At step S153, a printer to be used for printing is selected from the printer list registered in the printer search at step S13 of FIG. 4.

As described above, according to the printer driver of the present embodiment, of a plurality of printers on a network, printers included in the same category are recognized, and only basic settings for printing (the paper size, the print direction, etc.) are made on the printers included in the same category, so that the printers on the network can be easily used without a waste of space of a storage device included in the system.

Although the present invention has been fully described by way of examples with reference to the accompanying drawings, it is to be noted that various changes and modifications will be apparent to those skilled in the art. Therefore, unless otherwise such changes and modifications depart from the scope of the present invention, should be construed as being included therein.

What is claimed is:

1. A print control method converting data to data that can be accepted by a printer, and causing the printer to print the data by use of a printer driver, comprising the steps of:
   determining whether a driver common to a plurality of printers belonging to a predetermined category is selected or not;
   searching for, among printers connected to a network, printers belonging to the predetermined category when the common driver is selected, and listing found printers;
   setting a print condition selected only from basic setting items of the common driver by an input by an operator; and
   causing a printer selected from the list to perform printing.

2. A printer driver program on a computer-readable recording medium for converting data generated by use of a data processor to data that can be accepted by a printer, and transmitting the data to the printer, the printer driver program comprising the steps of:
   (a) searching for, among a plurality of printers networked to the data processor, a printer belonging to a predetermined category;
   (b) determining whether or not the found printer is supported by the printer driver program;
   (c) selecting one or more print settings from among only setting items that are common to a plurality of printers; and
   (d) providing a print instruction to the printer, which was found at the step (a) and was determined to be supported by the printer driver program at the step (b), based on the selected print setting or settings.

3. The printer driver program as claimed in claim 2, further comprising the step of:
   detecting a printing acceptance possible state of the found printer belonging to the predetermined category prior to the step (b).

4. The printer driver program as claimed in claim 2, wherein at the step (b), a plurality of printers which were determined to be supported by the printer driver program are listed, and at the step (d), the print instruction is provided to a printer selected from the list.

5. The printer driver program as claimed in claim 2, wherein the print settings include a paper size and a print direction.

6. The printer driver program as claimed in claim 2, wherein the printer belonging to the predetermined category is a printer using a specified kind of page description language.

7. The printer driver program as claimed in claim 2, wherein the printer belonging to the predetermined category is a printer manufactured by a maker of the printer driver program.

8. The printer driver program as claimed in claim 2, wherein the printer belonging to the predetermined category is a printer using a specified kind of interface.

9. A print control method for converting data generated by use of a data processor to data that can be accepted by a printer, and transmitting the data to the printer, the method comprising the steps of:
- (a) searching for, among a plurality of printers networked to the data processor, a printer belonging to a predetermined category;
- (b) determining whether the found printer is supported by the printer driver program or not;
- (c) selecting one or more print settings from among only setting items that are common to a plurality of printers; and
- (d) providing print instructions to the printer, which was found at the step (a) and was determined to be supported by the printer driver program at the step (b), based on the selected print setting or settings.

10. The print control method as claimed in claim 9, further comprising the step of:
detecting a printing acceptance possible state of the found printer belonging to the predetermined category prior to the step (b).

11. The print control method as claimed in claim 9, wherein at the step (b), a plurality of printers which were determined to be supported by the printer driver program are listed, and at the step (d), the print instruction is provided to a printer selected from the list.

12. The print control method as claimed in claim 9, wherein the print settings include a paper size and a print direction.

13. The print control method as claimed in claim 9, wherein the printer belonging to the predetermined category is a printer using a specified kind of page description language.

14. The print control method as claimed in claim 9, wherein the printer belonging to the predetermined category is a printer manufactured by a maker of the printer driver program.

15. The print control method as claimed in claim 9, wherein the printer belonging to the predetermined category is a printer using a specified kind of interface.

16. A print controller for converting data generated by use of a data processor to data that can be accepted by a printer based on a printer driver program, and transmitting the data to the printer, the printer controller comprising:
- a searching unit for searching for, among a plurality of printers networked to the data processor, a printer belonging to a predetermined category;
- a determination unit for determining whether or not the found printer is supported by the printer driver program;
- a selection unit for selecting one or more print settings from among only setting items that are common to a plurality of printers; and
- an instruction unit for providing print instructions to the printer, which was found by the searching unit and was determined to be supported by the printer driver program by the determination unit, based on the selected print setting or settings.

17. The print controller as claimed in claim 16, further comprising:
a detection unit for detecting a printing acceptance possible state of the found printer belonging to the predetermined category.

18. The print controller as claimed in claim 16, wherein the determination unit lists a plurality of printers which were determined to be supported by the printer driver program and the instruction unit provides the print instruction to a printer selected from the list.

19. The print controller as claimed in claim 16, wherein the print settings include a paper size and a print direction.

20. The print controller as claimed in claim 16, wherein the printer belonging to the predetermined category is a printer using a specified kind of page description language.

21. The print controller as claimed in claim 16, wherein the printer belonging to the predetermined category is a printer manufactured by a maker of the printer driver program.

22. The print controller as claimed in claim 16, wherein the printer belonging to the predetermined category is a printer using a specified kind of interface.

* * * * *